(12) United States Patent
Nagai et al.

(10) Patent No.: US 7,042,706 B2
(45) Date of Patent: May 9, 2006

(54) LAMINATED CERAMIC ELECTRONIC COMPONENT AND METHOD OF MANUFACTURING THE ELECTRONIC COMPONENT

(75) Inventors: Atsuo Nagai, Osaka (JP); Jun Otsuki, Osaka (JP); Hideki Kuramitsu, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 297 days.

(21) Appl. No.: 10/471,970

(22) PCT Filed: Oct. 22, 2002

(86) PCT No.: PCT/JP02/10925

§ 371 (c)(1),
(2), (4) Date: Sep. 15, 2003

(87) PCT Pub. No.: WO03/036666

PCT Pub. Date: May 1, 2003

(65) Prior Publication Data

US 2004/0090721 A1 May 13, 2004

(30) Foreign Application Priority Data

Oct. 25, 2001 (JP) .................................. 2001-327343

(51) Int. Cl.
*H01G 4/008* (2006.01)
*C02B 29/00* (2006.01)

(52) U.S. Cl. ............... 361/305; 361/311; 29/25.42; 156/89.12

(58) Field of Classification Search ......... 361/311–315, 361/303–305, 301.4, 322, 321.1, 321.2, 321.3, 361/321.4, 321.5; 156/89.12; 29/25.42
See application file for complete search history.

(56) References Cited

U.S. PATENT DOCUMENTS 3,113,253 A * 12/1963 Ishikawa et al. ............ 361/313
5,632,833 A * 5/1997 Kurano et al. .............. 427/125
5,835,339 A * 11/1998 Sakamoto et al. ........ 361/321.2
5,910,881 A * 6/1999 Ueno ......................... 361/313

FOREIGN PATENT DOCUMENTS

| JP | 3-116810 A | 5/1991 |
| JP | 7-37748 A | 2/1995 |
| JP | 2000-340450 A | 12/2000 |

OTHER PUBLICATIONS

International Search Report for application No. PCT/JP02/10925 dated Jan. 21, 2003.

* cited by examiner

*Primary Examiner*—Dean A. Reichard
*Assistant Examiner*—Eric Thomas
(74) *Attorney, Agent, or Firm*—RatnerPrestia

(57) ABSTRACT

A multilayer ceramic electronic component includes a laminate having ceramic layers and internal electrodes stacked alternately one on another, and at least one kind of metal oxide between respective one of the ceramic layers and corresponding one of the internal electrodes. A method of manufacturing a multilayer ceramic electronic component includes a first step of stacking ceramic sheets and metal layers alternately one on another to fabricate a laminate and a second step of firing the laminate. Respective one of the metal layers has, on the surface of a sheet-like first metal, a second metal more susceptible to oxidation than the first metal. The second step is performed at an oxygen partial pressure at which the first metal is hardly oxidized and the second metal is oxidized.

11 Claims, 6 Drawing Sheets 14  12  11 ized. Thus, the metal layer is made of Al thin film 23, 
LAMINATED CERAMIC ELECTRONIC COMPONENT AND METHOD OF MANUFACTURING THE ELECTRONIC COMPONENT This Application is a U.S. National Phase Application of PCT International Application PCT/JP02/10,925.

TECHNICAL FIELD

The present invention relates to a multilayer ceramic electronic component, such as a multilayer ceramic capacitor, and to a method of manufacturing the electronic component.

BACKGROUND ART

Hereinafter, a description is provided of a conventional multilayer ceramic capacitor and a method of manufacturing the capacitor.

FIG. 6 is a sectional view of a conventional multilayer ceramic capacitor.

First, a ceramic sheet for forming ceramic layer 101 is produced by mixing a dielectric material (e.g. barium titanate), polyvinyl butyral, a resin (e.g. acrylic), and a solvent, slurrying the mixture, and then using a doctor blade method.

Next, nickel (hereinafter referred to as Ni) powder and an organic material, such as a binder, are mixed to prepare electrode paste. Internal electrode 102 of a desired shape is formed using the electrode paste. The respective internal electrodes and ceramic sheets are stacked alternately one on another to form a laminate. After this laminate is fired, external electrodes 103 are formed on both end faces where internal electrodes 102 are exposed.

In this method, the Ni and the ceramic sheet are joined by the resin contained in the ceramic sheet or the electrode paste. After the resin has decomposed and vaporized during the firing process, adhesion between the Ni and the ceramic sheet is lost. This has a problem: a difference in sintering shrinkage factors between the Ni and the ceramic causes structural defects, such as delamination 104.

DISCLOSURE OF THE INVENTION

A multilayer ceramic electronic component includes:
a laminate having ceramic layers and internal electrodes stacked alternately one on another; and
at least one kind of metal oxide between respective one of the ceramic layers and corresponding one of the internal electrodes.

A method of manufacturing a multilayer ceramic electronic component includes:
a first step of fabricating a laminate by stacking ceramic sheets and metal layers alternately one on another; and
a second step of sintering the laminate;
in which, each of the metal layers has, on the surface of a sheet-like first metal, a second metal more susceptible to oxidation than the first metal; and
the second step is performed at an oxygen partial pressure at which the first metal is hardly oxidized and the second metal is oxidized.

DETAILED DESCRIPTION OF PREFERRED EMBODIMENTS

The present invention provides a multilayer ceramic electronic component. In the ceramic electronic component, adhesion between respective internal electrodes and corresponding ceramic layers thereof is improved in a firing step, and structural defects caused by a difference in sintering shrinkage factors between the internal electrodes and the ceramic layers can be restrained. The present invention also provides a method of manufacturing the multilayer ceramic electronic component.

First Exemplary Embodiment

Hereinafter, a description is provided of claims 1 through 6 of the present invention given below, using the first exemplary embodiment, i.e. a multilayer ceramic capacitor, as an example.

Figure 1:
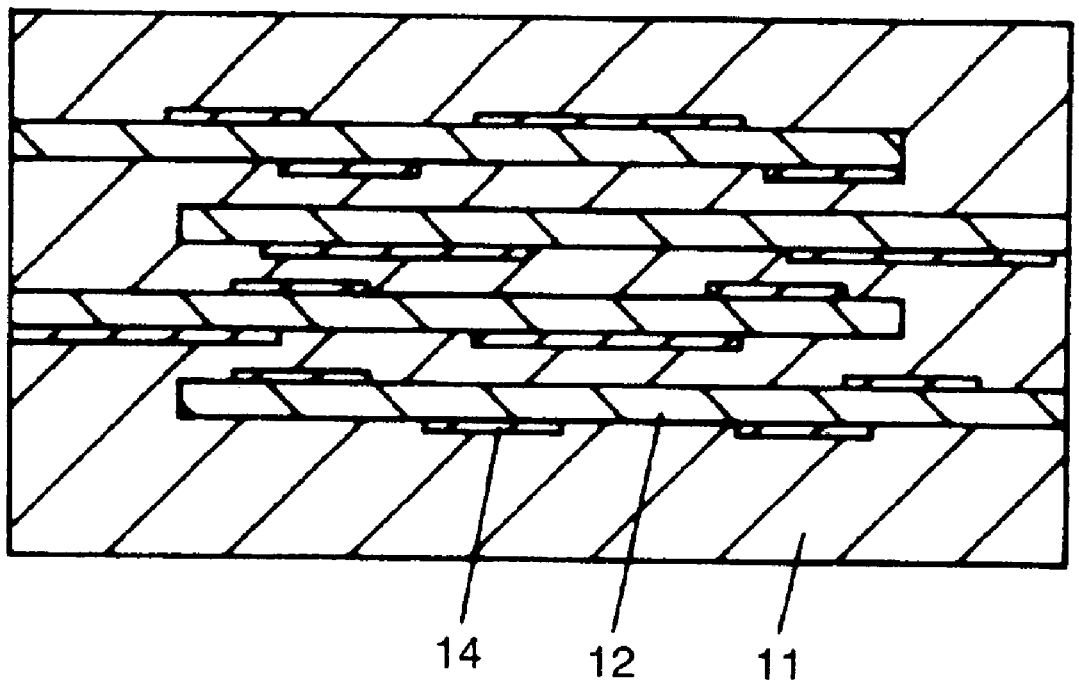
FIG. 1 is a partially enlarged sectional view of a laminate after firing in accordance with a first exemplary embodiment of the present invention.
Figure 2:
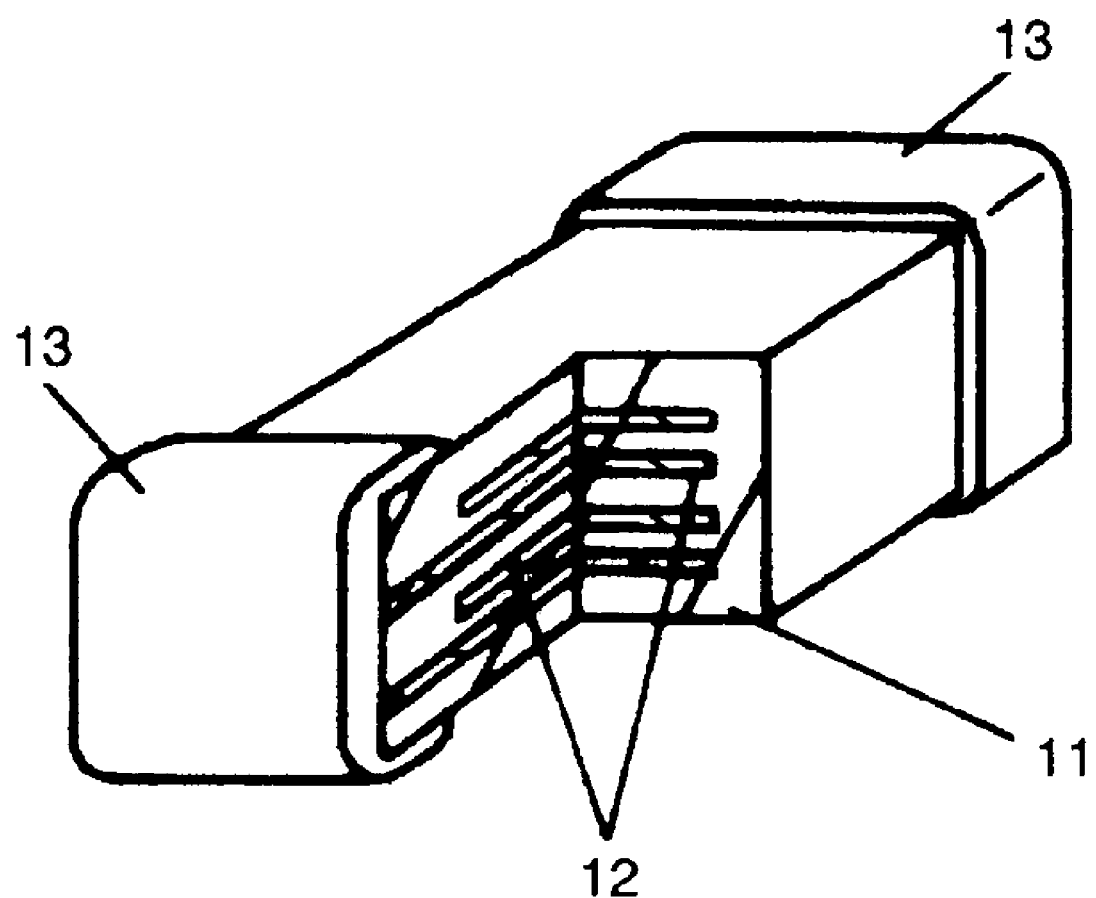
FIG. 2 is a partially cutaway view in perspective of a multilayer ceramic capacitor in accordance with the first exemplary embodiment of the present invention.

FIG. 1 is a partially enlarged sectional view of a laminate after firing in accordance with the first exemplary embodiment of the present invention. FIG. 2. is a partially cutaway view in perspective of the multilayer ceramic capacitor in accordance with the first exemplary embodiment. The laminate has ceramic layers 11 essentially consisting of barium titanate and internal electrodes 12 essentially consisting of Ni that are stacked alternately one on another. External electrodes 13 are formed on both end faces of the laminate. Provided in the interface between each of internal electrodes 12 and corresponding ceramic layers 11 is aluminum (hereinafter referred to as Al) oxide 14 for improving the adhesive strength therebetween.

Figure 3:
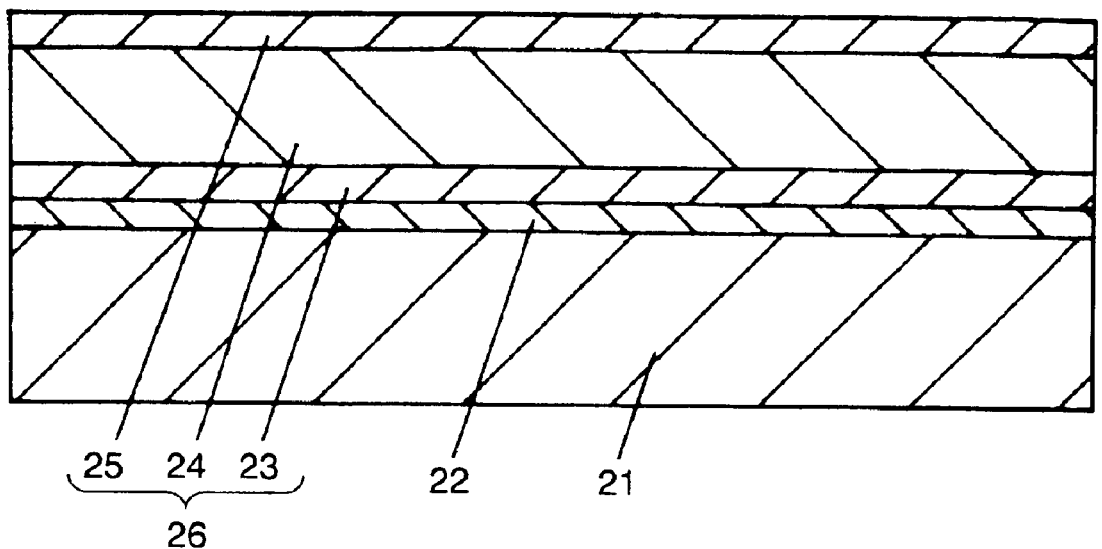
FIG. 3 is a sectional view illustrating a process of manufacturing the multilayer ceramic capacitor in accordance with the first exemplary embodiment of the present invention.

FIG. 3 is a sectional view illustrating a process of manufacturing the multilayer ceramic capacitor in accordance with the first exemplary embodiment of the present invention. Formed on base film 21 made of a material, such as polyethylene terephthalate (hereinafter referred to as PET), is release layer 22 made of a material, such as silicon (hereinafter referred to as Si). Metal layer 26 is formed on this release layer. The metal layer is made of Al thin film 23, Ni thin film 24 for forming internal electrode 12, and Al thin film 25.

First, a ceramic sheet for forming 8-μm-thick ceramic layer 11 is formed on a PET film by mixing a dielectric material (e.g. barium titanate), a binder containing polyvinyl butyral, dibutyl phthalate as a plasticizer, and butyl acetate as a solvent, slurrying the mixture, and then using a doctor blade method.

On the other hand, as shown in FIG. 3, Al thin film 23 is formed on the top face of base film 21 having release layer 22 of silicon resin, by sputtering, in a chamber (not shown). Further, Ni thin film 24, and Al thin film 25 are formed on Al thin film 23 in a similar manner. Thus, metal layer 26 of a three-layer structure is formed. At this time, in order to provide dense metal layer 26, this process is performed while inert gas is introduced into the chamber and base film 21 is heated at temperatures ranging from 100 to 130° C.

Ni thin film 24 is formed to have a thickness of 0.5 μm. Each of Al thin films 23 and 25 is formed to have a thickness ranging from 0.05 to 0.4 μm. Al films 23 and 25 having a thickness greater than 0.4 μm make internal electrode 12 thicker and decrease the dielectric constant. Thus, a capacitor having a large capacity cannot be provided.

Next, this metal layer 26 is machined to the shape of internal electrode 12. It is preferable to use a laser for machining because laser machining can form internal electrode 12 precisely.

Sequentially, metal layer 26 having the shape of internal electrode 12 shown in FIG. 1 and a ceramic sheet are placed one on the other. The laminate is pressed via base film 21 at a pressure of 10 MPa, using a pressing plate heated to a temperature of 130° C. When base film 21 is removed after the pressure is released, metal layer 26 is transferred onto the ceramic sheet. Softening the binder and plasticizer in the ceramic sheet by this heat and press step improves adhesion between the ceramic sheet and metal layer 26 and increases the contact area thereof.

At this time, it is desirable to provide an organic material for improving adhesion between metal layer 26 and the ceramic sheet on either of them. Specifically, polyvinyl butyral resin used as a binder in the ceramic sheet is used for this purpose. In other words, it is desirable to provide a uniform thickness of the material used in the ceramic sheet as a binder, in at least a portion of the ceramic sheet in contact with metal layer 26. Of course, the material used as a plasticizer can also be used. However, the binder has a larger adhesive effect.

Release layer 22 is made of silicon resin. This layer is for improving releasability of metal layer 26 from base film 21. Thus, this layer allows precise formation of internal electrode 12 and improves the yields.

Next, a ceramic sheet having metal layer 26 formed thereon is placed on a plurality of laminated ceramic sheets. This laminate is heated from the side of the base film for the transfer purpose. Then, base film 21 is removed. On this laminate, 200 ceramic sheets each having metal layer 26 formed thereon are stacked one on another, and the heat and transfer step is repeated in the same manner as described above. Then, a plurality of ceramic sheets are laminated thereon to form a laminate block. The heating temperatures in fabrication of the laminate block are set from 100 to 130° C., in order for the binder in the ceramic sheets to soften sufficiently. Within this temperature range, the higher the temperature, the closer the adhesion between the ceramic sheets and metal layers 26. Pressing at pressures of at least 10 MPa can further improve the adhesion between the ceramic sheets and metal layers 26. Formation of metal layer 26 on a ceramic sheet and lamination of ceramic sheets each having metal layer 26 formed thereon are performed at similar temperatures and pressures. However, the temperatures and pressures are determined in consideration with the thickness of the ceramic sheets, the kind of the binder, the dielectric material, and other factors so that the laminate block is not excessively deformed.

Next, the laminate block is cut and separated into individual laminates. Then the individual laminates are subjected to a binder-removing step and a firing step. Thus, sintered bodies are formed. The binder-removing step is performed in nitrogen at a temperature of 350° C., because Al thin films 23 and 25 may be oxidized but Ni thin film 24 for forming internal electrode 12 should not excessively be oxidized. On the other hand, the firing step is performed by heating the laminates to a temperature as high as 1300° C., at which the ceramic sheets sufficiently sinter. In the temperature-rising sub-step, hydrogen gas (hereinafter referred to as $H_2$ gas) and carbon dioxide gas ($CO_2$ gas) are used. The atmosphere is controlled so that Ni thin film 24 is not excessively oxidized to function as internal electrode 12 and Al thin films 23 and 25 are oxidized.

Especially, at temperatures from 500 to 1,300° C., preferably from 600 to 1,000° C., the ratio of $H_2$ gas and $CO_2$ gas are controlled so that Ni is not oxidized and Al is oxidized, in order to improve adhesion between ceramic layer 11 and internal electrode 12. At this time, Ni starts to sinter earlier than ceramic layer 11. When sintering begins, shrinkage begins. Therefore, existence of Al oxide 14 in the interface between the Ni and ceramic layer 11 can restrain shrinkage of the Ni and occurrence of structural defects.

In the temperature-lowering sub-step, it is important to stop $H_2$ gas supply and increase the oxygen partial pressure at temperatures up to 1,100° C., in order to improve insulating properties of ceramic layer 11 while restraining oxidation of internal electrode 12.

In this firing step, part of Al thin films 23 and 25 change to an Al oxide, and the Al oxide diffuses into the grains and grain boundaries of ceramic layer 11. For this reason, Al oxide 14 intermittently exists in the interface between ceramic layer 11 and internal electrode 12. Al thin films 23 and 25 oxidize and contribute to adhesion between Ni thin film 24 and ceramic layer 11. In other words, Ni thin film 24 does not sinter and shrink independently, but it unites with ceramic layer 11 via Al oxide 14 and shrinks together with ceramic layer 11 at the same time at temperatures of 1,100° C. or higher. This can restrain the occurrence of structural defects. The Al diffusing into ceramic layer 11 also contributes to improvement in the dielectric constant of ceramic layer 11.

Although part of the Al diffuses into ceramic layer 11, the thickness of the Al film makes almost no change, like that of Ni thin film 24. Therefore, the Al film can be set to a desired thickness in the thin film formation step.

After the firing step, the corners of the laminate are ground. Copper (hereinafter referred to as Cu) is applied to both end faces of the laminate as external electrodes 13 and baked. Thus, a multilayer ceramic capacitor is provided.

Table 1 shows the number of occurrence of structural defects found when the thickness of Al thin films 23 and 25 provided on the front face and rear face of Ni thin film 24, respectively, is set to 0 μm, 0.05 μm, 0.1 μm, 0.3 μm, or 0.4 μm. (When the thickness is set to 0 μm, no Al films 23 and 25 are formed.)

TABLE 1

| Thickness of Al thin film (μm) | 0 | 0.05 | 0.1 | 0.3 | 0.4 |
|---|---|---|---|---|---|
| Number of occurrence of delamination | 5/30 | 0/30 | 0/30 | 0/30 | 0/30 |

With reference to Table 1, when Al thin film 23 and 25 are not formed, delamination appears. However, when Al thin films 23 and 25 are formed, occurrence of delamination is restrained. Observations of the interface between internal electrode 12 and ceramic layer 11 in this case using a scanning electron microscope (SEM) show the existence of Al oxide 14 as shown in FIG. 1. It is considered that the existence of the Al oxide has improved adhesion between internal electrode 12 (Ni thin film 24) and ceramic layer 11. With thicker Al thin films 23 and 25, more sufficient adhesion property can be obtained. However, the thicker Al thin films result in thicker Al oxide (a layer having a low dielectric constant) existing between Ni thin film 24 (internal electrode 12) and ceramic layer 11. Thus, the capacitance is decreased. Especially when ceramic layer 11 is thin, the capacitance is significantly affected. Currently commercialized multilayer ceramic capacitors have ceramic layers 11 each having a thickness of approx. 3 μm after firing. Additionally, there is a tendency to further thinner ceramic layers 11 in the future. Therefore, in order to restrain a decrease in capacitance and improve adhesion between ceramic layer 11 and internal electrode 12 for ceramic layer 11 having a thickness smaller than 3 μm, it is preferable to form Al thin films 23 and 25 each having a thickness up to 0.3 μm on the surfaces of Ni thin film 24.

These Al thin films 23 and 25 can improve adhesion between ceramic layer 11 and internal electrode 12 and restrain the occurrence of structural defects when they are formed continuous as shown in the first exemplary embodiment. However, in this case, a layer having a low dielectric constant (Al oxide) existing in the interface between ceramic layer 11 and internal electrode 12 has greater influence and thus deteriorates electrical characteristics. In contrast, when Al thin films 23 and 25 are partially formed, the deterioration of electrical characteristics can be restrained but the adhesive properties are not so excellent as those of the first exemplary embodiment. Therefore, it is preferable to provide Al thin films 23 and 25 to satisfy both adhesive properties and electrical characteristics. Specifically, it is preferable that the equivalent series resistance of internal electrode 12 is at most 100 times that of the Ni.

Additionally, it is preferable that Ni thin film 24 (internal electrode 12) has a thickness ranging from 0.1 to 0.7 μm for the following reasons. With a thickness of Ni thin film 24 smaller than 0.1 μm, continuity of Ni thin film 24 is lost during firing and electrical conductivity cannot be obtained, in some cases. In contrast, with a thickness of Ni thin film 24 larger than 0.8 μm, insufficient pressure is placed on a portion having no metal layer 26 formed thereon when ceramic sheet each having metal layer 26 thereon are laminated. This may cause poor adhesion. With a thickness of Ni thin film 24 up to 0.7 μm, lamination of even several hundreds of sheets can ensure adhesion between portions having no metal layer 26 formed thereon in ceramic sheets.

During sintering, part of Al diffuses into ceramic layer 11. It is considered that this Al diffusing into ceramic layer 11 also serves to improve adhesion between the both.

In the first exemplary embodiment, description is provided of the case in which Al thin films 23 and 25 are provided on the front and rear faces of Ni thin film 24, respectively, as a metal more susceptible to oxidation than Ni. Instead of Al thin films 23 and 25, Cr or Mg thin films can be formed. However, when a thin film of a metal is formed on the front face and a thin film of a different metal is formed on the rear face, the adhesive strengths between internal electrode 12 and ceramic layers 11 are different on the both faces. This is prone to cause structural defects. Therefore, it is desirable to form thin films of the same metal on the front and rear faces of Ni thin film 24.

(Second Exemplary Embodiment)

Hereinafter, a description is provided of claim 7 of the present invention given below, using the second exemplary embodiment, i.e. a multilayer ceramic capacitor, as an example.

Figure 4:
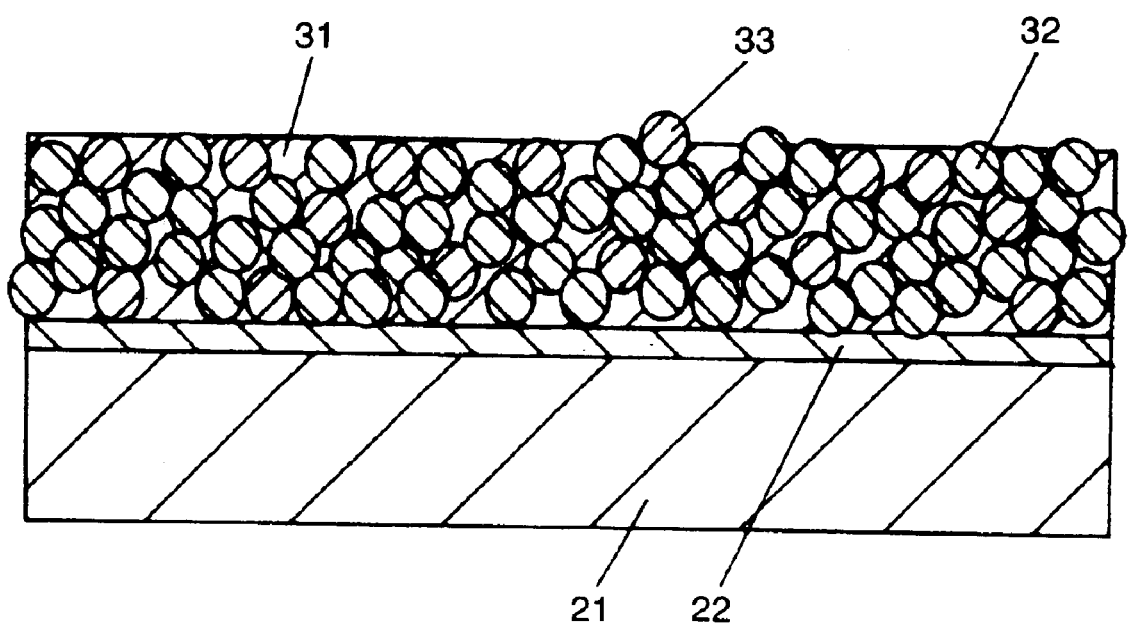
FIG. 4 is a sectional view illustrating a process of manufacturing a multilayer ceramic capacitor in accordance with a second exemplary embodiment of the present invention.

FIG. 4 is a sectional view showing an image of a multilayer ceramic capacitor in accordance with the second exemplary embodiment for illustrating a manufacturing process thereof. Release layer 22 made of a material, such as silicon, is formed on base film 21 made of a material, such as PET. Formed on the release layer is Ni—Al metal layer 31. In this metal layer 31, Ni particles 32 and Al particles 33 are mixed.

First, in a manner as described in the first exemplary embodiment, a ceramic sheet for forming dielectric ceramic layer 11 is formed on a PET film.

On the other hand, as shown in FIG. 4, Ni—Al metal layer 31 is formed on the entire surface of base film 21, in a manner similar to that of the first exemplary embodiment. This metal layer 31 has a thickness of 0.7 μm, and contains 90 wt % of Ni and 10 wt % of Al.

Next, in a manner as described in the first exemplary embodiment, this metal layer 31 is machined to the shape of internal electrode 12 and placed on a ceramic sheet, to provide a ceramic sheet having metal layer 31 formed thereon. Sequentially, in a manner similar to that of the first exemplary embodiment, a laminate is fabricated, cut, and then fired.

At last, external electrodes 13 are formed, to provide a multilayer ceramic capacitor as shown in FIG. 2.

Also in the second exemplary embodiment, oxidizing Al particles 33 existing in the interface portion between metal layer 31 and the ceramic sheet during firing improves adhesive strength between ceramic layer 11 and internal electrode 12 and restrains the occurrence of structural defects.

Used in the second exemplary embodiment is metal layer 31 containing 90 wt % of Ni particles 32 and 10 wt % of Al particles 33. Preferably, the content of Al particles 33 is up to 10 wt % (except for 0 wt %) for the following reasons. Al particles 33 contributing to improvement in adhesion between ceramic layer 11 and internal electrode 12 are only those existing on the surface of metal layer 31. Al particles 33 existing inside of the metal layer are oxidized and the oxidized Al particles deteriorate the electrical conductivity of internal electrode 12.

During sintering, part of the Al diffuses into ceramic layer 11. It is considered that this Al diffusing into ceramic layer 11 also serves to improve adhesion between internal electrode 12 and ceramic layer 11.

In this embodiment, Ni—Al alloy is used. Instead of Al, chromium (hereinafter referred to as Cr) or magnesium (Mg), both of which are metals more susceptible to oxidation than Ni, can be used. In other words, it is desirable to form metal layer 31 using an alloy containing Ni and at least one of Al, Cr, and Mg.

For the first and second exemplary embodiments, too thin internal electrode 12 formed by thin film techniques may lose its continuity during firing, and thus desired conductivity cannot be obtained in some cases. In such a case, it is desirable to laminate a plurality of metal layers 26 shown in FIG. 3, in the first exemplary embodiment, for example, in order to form internal electrode 12 having a desired thickness.

In the above description, metal layers 26 and 31 are formed by sputtering. However, similar effects can be obtained by the other thin film techniques, such as vacuum evaporation and chemical vapor deposition (CVD). In other words, the present invention can improve adhesive strength between ceramic layer 11 and internal electrode 12 even though no organic material, such as resin, exists in metal layers 26 and 31.

(Third Exemplary Embodiment)

Hereinafter, a description is provided of claims 1 and 7 of the present invention given below, using the third exemplary embodiment.

Figure 5:
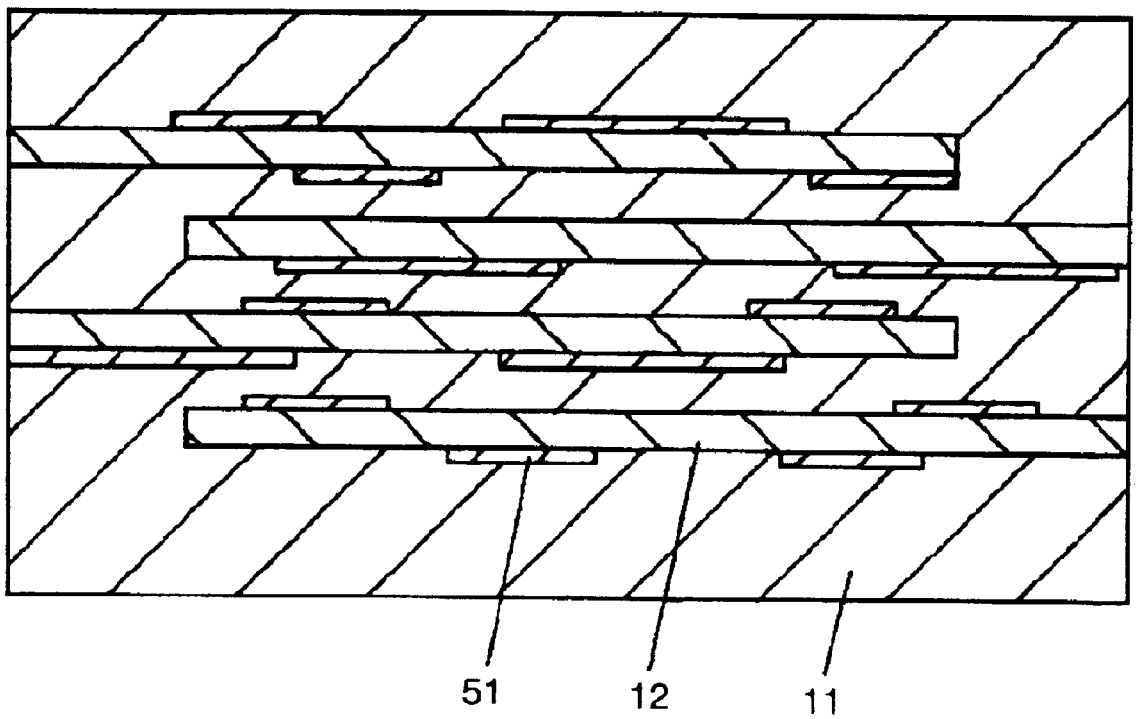
FIG. 5 is a partially enlarged sectional view of a laminate after firing in accordance with a third exemplary embodiment of the present invention.
Figure 6:
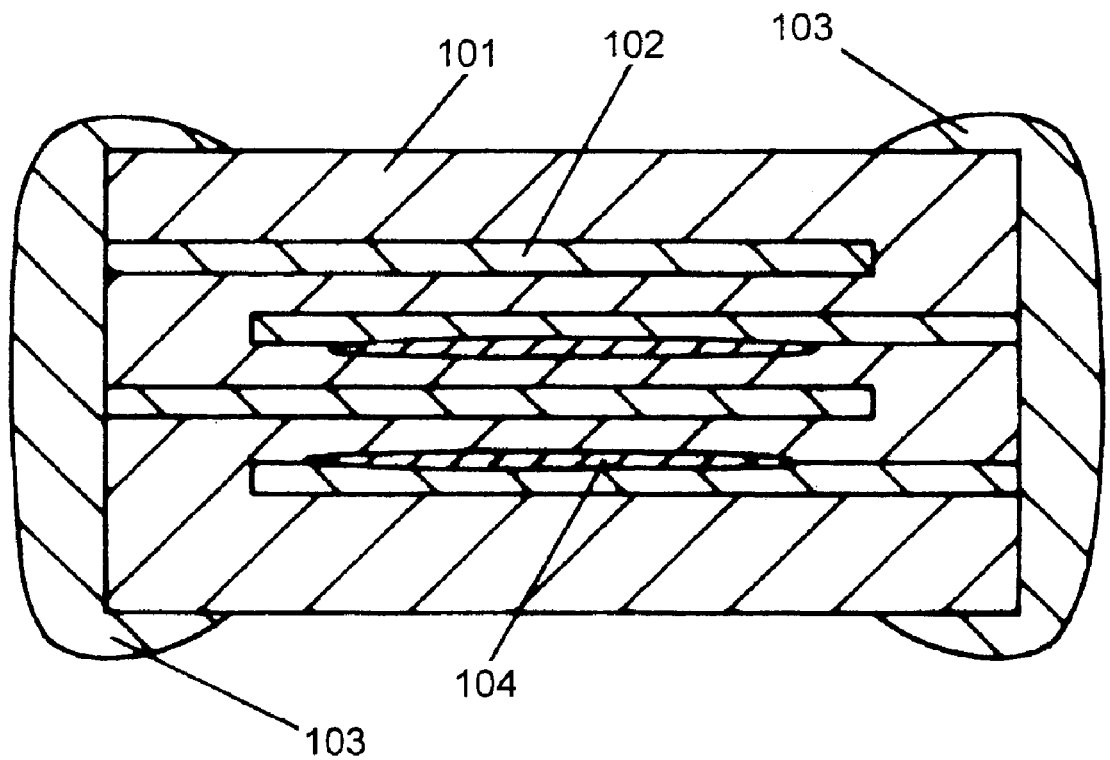
FIG. 6 is a sectional view of a conventional multilayer ceramic capacitor.

FIG. 5 is a partially enlarged sectional view of a laminate after firing in accordance with the third exemplary embodiment. Elements other than metal oxide 51 are the same as those shown in FIG. 1, and the description of each of these elements is omitted. The metal oxide is oxides of Al and Mg.

First, a ceramic sheet for forming 8-μm-thick ceramic layer 11 is formed on base film 21 by mixing a dielectric material (e.g. barium titanate), a binder containing polyvinyl butyral, dibutyl phthalate as a plasticizer, and butyl acetate as a solvent, slurrying the mixture, and then using a doctor blade method.

On the other hand, electrode paste is prepared by mixing a binder containing polyvinyl butyral, dibutyl phthalate as a plasticizer, and butyl acetate as a solvent with Ni powder, Al powder, and Mg powder. As for the mixing ratio of these powders, Al and Mg powders are 0.5 to 6.0 wt %, preferably 0.5 to 2.0 wt %, with respect to 100 wt % of Ni powder. (Mg powder is up to 4 wt % and Al powder is up to 2 wt %.)

The electrode paste is screen-printed on a PET film having a release layer of silicon resin, in the form of internal electrode 12. The thickness of internal electrode 12 is 2 μm.

Sequentially, internal electrode 12 and a ceramic sheet are placed one on the other. The laminate is pressed via the base film at a pressure of 10 MPa, using a pressing plate heated to a temperature of 130° C. When the base film is removed after the pressure is released, internal electrode 12 is transferred onto the ceramic sheet. Softening the binders in the ceramic sheet and internal electrode 12 by this heat and press step improves adhesion between the ceramic sheet and internal electrode 12 and increases the contact area thereof. The release layer is for improving releasability of internal electrode 12 from the base film. This layer allows precise transfer of internal electrode 12 and improves the yields.

Next, a ceramic sheet having internal electrode 12 transferred thereon is placed on a plurality of laminated ceramic sheets. This laminate is heated from the side of the base film for the transfer purpose. Then, the base film is removed. On this laminate, 200 ceramic sheets each having internal electrode 12 formed thereon are stacked one on another, and the heat and transfer step is repeated in the same manner as described above. Then, a plurality of ceramic sheets are laminated thereon, to form a laminate block.

The heating temperatures in fabrication of the laminate block are set from 100 to 130° C., in order for the binders in the ceramic sheets and internal electrodes 12 to soften sufficiently. Within this temperature range, the higher the temperature, the closer the adhesion between the ceramic sheets and internal electrodes 12. Pressing at pressures of at least 10 MPa can further improve the adhesion between the ceramic sheets and internal electrodes 12. Transfer of internal electrode 12 onto a ceramic sheet and lamination of ceramic sheets each having internal electrode 12 formed thereon are performed at similar temperatures and pressures. However, the temperatures and pressures are determined in consideration with the thicknesses of the ceramic sheet and internal electrode 12, the kind of the binders, the dielectric material, the material of the internal electrode, and other factors so that the laminate block is not excessively deformed.

Next, the laminate block is cut and separated into individual laminates. Then the individual laminates are subjected to a binder-removing step and a firing step. Thus, sintered bodies are formed. The binder-removing step is performed in nitrogen at a temperature of 350° C., because Al and Mg may be oxidized but Ni for forming internal electrode 12 should not excessively be oxidized. On the other hand, the firing step is performed by heating the laminates to a temperature as high as 1300° C., at which the ceramic sheets sufficiently sinter. In the temperature-rising sub-step, $H_2$ gas and $CO_2$ gas are used. The atmosphere is controlled so that Ni is not excessively oxidized to function as internal electrode 12 and Al and Mg are oxidized.

Especially, at temperatures from 500 to 1,300° C., preferably from 600 to 1,000° C., the ratio of $H_2$ gas and $CO_2$ gas are controlled so that Ni is not oxidized and Al and Mg are oxidized, in order for adhesion between ceramic layer 11 and internal electrode 12 to improve. At this time, Ni starts to sinter earlier than ceramic layer 11. When sintering begins, shrinkage begins. Therefore, existence of Al oxide and Mg oxide 51 in the interface between the Ni and ceramic layer 11 can restrain shrinkage of the Ni and occurrence of structural defects.

In the temperature-lowering sub-step, it is important to stop $H_2$ gas supply and increase the oxygen partial pressure at temperatures up to 1,100° C., in order to improve insulating properties of ceramic layer 11 while restraining oxidation of internal electrode 12.

In this firing step, part of Al and Mg change to Al and Mg oxides, and the Al and Mg oxides diffuse into the grains and grain boundaries of ceramic layer 11. For this reason, these metal oxides 51 intermittently exist in the interface between ceramic layer 11 and internal electrode 12 and contribute to adhesion between internal electrode 12 and ceramic layer 11. In other words, internal electrode 12 does not sinter and shrink independently, but it unites with ceramic layer 11 via metal oxides 51, i.e. oxides of Al and Mg, and shrinks together with ceramic layer 11 at the same time at temperatures of 1,100° C. or higher. This can restrain the occurrence of structural defects. The Al and Mg oxides diffusing into ceramic layer 11 also contribute to improvement in the dielectric constant of ceramic layer 11.

After the firing step, the corners of the laminate are ground. Cu is applied to both end faces as external electrodes 13 and baked. Thus, a multilayer ceramic capacitor is provided.

Like the first exemplary embodiment, for the multilayer ceramic capacitor obtained in this manner, a decrease in capacitance is restrained, adhesion between ceramic layers 11 and internal electrodes 12 is improved, and no structural defects, such as delamination, is found.

In this embodiment, Ni, Al, and Mg are mixed for use as metal paste. The components are not limited to these. Mixing at least one of Al, Mg, and Cr with Ni in an amount up to 5 wt %, preferably up to 2 wt %, with respect to 100 wt % of Ni, can also provide a multilayer ceramic capacitor having excellent adhesion property between ceramic layers 11 and internal electrodes 12.

In the first through third exemplary embodiments, Ni is used for internal electrode 12. When internal electrode 12 is formed by another metal, it is desirable to coat the metal of internal electrode 12 with a metal that is more susceptible to oxidation than the electrode metal and does not adversely affect the electrical characteristics to be obtained.

When the volume of a metal oxide existing between ceramic layer 11 and internal electrode 12 is too large, desired electrical characteristics cannot be obtained in some cases. Therefore, it is desirable to provide a minimum quantity of this metal oxide sufficient for improving the adhesive strength between ceramic layer 11 and internal electrode 12. For this purpose, a metal changing to a metal oxide can be provided only on part of the metal of internal electrode 12 instead of on the entire surface thereof. Additionally, a plurality of kinds of metals changing to metal oxides can be used.

The laminate is fired in an atmosphere in which internal electrodes 12 hardly oxidize and the metal provided on the surfaces of internal electrodes 12 oxidize. Therefore, excellent results are obtained by a larger difference in equilibrium oxygen partial pressures between the metal of internal electrodes 12 and the metal provided thereon.

Each of the embodiments is described, using a multilayer ceramic capacitor as an example. However, similar effects can be obtained with a multilayer ceramic electronic component in which ceramic layers, a metal of internal electrodes, a metal oxide (or a metal that changes to a metal oxide by sintering) existing in the interface between the respective ceramic layers and the corresponding internal electrodes can integrally be fired.

As discussed above, in the present invention, existence of a metal oxide between a ceramic layer and an internal electrode can improve the adhesive strength therebetween and restrain structural defects, such as delamination.

The metal oxide can improve the adhesive strength between the ceramic layer and the internal electrode and restrain structural defects.

The internal electrode essentially consists of Ni. The metal oxide is an oxide of at least one of Cr, Mg, and Al. The metal oxide can improve the adhesive strength between the ceramic layer and the internal electrode and restrain structural defects.

A metal layer fired into a laminate has, on the surface of a sheet-like first metal, a second metal more susceptible to oxidation than the first metal. The laminate is fired at an oxygen partial pressure at which the first metal is hardly oxidized and the second metal is oxidized. Thus, the oxide of the second metal can improve the adhesive strength between the ceramic layer and the first metal for forming the internal electrode and restrain occurrence of structural defects.

In the metal layer, the surface of the sheet-like first metal is coated with the second metal. When the laminated is fired, the second metal is oxidized, and this metal oxide can improve the adhesive strength between the ceramic layer and the first metal and restrain occurrence of structural defects.

Additionally, a metal layer containing no organic material has a high metal density. Thus, a thin and continuous internal electrode can be obtained.

A metal layer constituting a laminate contains a third metal as a main component thereof, and a fourth metal more susceptible to oxidation than the third metal as a sub component thereof. Because the laminate is fired at an oxygen partial pressure at which the third metal is hardly oxidized and the fourth metal is oxidized, the fourth metal oxidizes and deposits in the interface between a ceramic layer and the third metal. This metal oxide improves the adhesive strength between the ceramic layer and the third metal and thus can restrain occurrence of structural defects.

INDUSTRIAL APPLICABILITY

In accordance with a multilayer ceramic electronic component and a method of manufacturing the electronic component of the present invention, existence of a metal oxide between a ceramic layer and an internal electrode thereof can improve adhesive strength therebetween and restrain structural defects, such as delamination.

Reference Numerals in the Drawings
11 Ceramic layer
12 Internal electrode
13 External electrode
14 Al oxide
21 Base film
22 Release layer
23 Al thin film
24 Ni thin film
25 Al thin film
26 Metal layer
31 Metal layer
32 Ni particle
33 Al particle
51 Metallic oxide

What is claimed is:

1. A method of manufacturing a multilayer ceramic electronic component, the method comprising:

a first step of stacking a ceramic sheet and a metal layer alternately one on another to fabricate a laminate; and a second step of firing the laminate, wherein the metal layer has, on a surface of a sheet-like first metal, a layer of a second metal more susceptible to oxidation than the first metal; and wherein said second step of firing is performed at an oxygen partial pressure in which the first metal is hardly oxidized and the second metal is oxidized.

2. The method of manufacturing a multilayer ceramic electronic component of claim 1, wherein the first metal consists essentially of Ni, and the second metal comprises at least one of Cr, Mg, and Al.

3. The method of manufacturing a multilayer ceramic electronic component of claim 1, wherein the metal layer has the second metal coating the surface of the first metal.

4. The method of manufacturing a multilayer ceramic electronic component of claim 1, wherein the metal layer contains no organic material.

5. The method of manufacturing a multilayer ceramic electronic component of claim 1, wherein the metal layer is a metal film formed by a thin film forming method.

6. The method of manufacturing a multilayer ceramic electronic component of claim 1, wherein the first metal consists essentially of Ni, and the second metal is Al.

7. A multilayer ceramic electronic component manufactured by the method of manufacturing a multilayer ceramic electronic component of claim 6.

8. A multilayer ceramic electronic component manufactured by the method of manufacturing a multilayer ceramic electronic component of claim 1.

9. A method of manufacturing a multilayer ceramic electronic component, the method comprising:

a first step of stacking a ceramic sheet and a metal layer alternately one on another to fabricate a laminate; and a second step of firing the laminate, wherein:

the metal layer contains a first metal as a main component thereof and a second metal more susceptible to oxidation than the first metal as a sub component thereof, said second step is performed at an oxygen partial pressure in which the first metal is hardly oxidized and the second metal is oxidized, and an oxide of the second metal is formed in an interface between the ceramic sheet and the first metal.

10. The method of manufacturing a multilayer ceramic electronic component of claim 9, wherein the first metal consists essentially of Ni, and the second metal comprises at least one of Cr, Mg, and Al.

11. A multilayer ceramic electronic component manufactured by the method of manufacturing a multilayer ceramic electronic component of claim 9.

* * * * *